US008198397B2

(12) United States Patent
Wonders et al.

(10) Patent No.: US 8,198,397 B2
(45) Date of Patent: Jun. 12, 2012

(54) INTEGRATED STEAM HEATING IN POLYESTER PRODUCTION PROCESS

(75) Inventors: Alan George Wonders, Longview, TX (US); James Donald Simpson, Beaumont, TX (US); Bruce Roger DeBruin, Lexington, SC (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 339 days.

(21) Appl. No.: 12/558,003

(22) Filed: Sep. 11, 2009

(65) Prior Publication Data

US 2010/0113736 A1     May 6, 2010

Related U.S. Application Data

(60) Provisional application No. 61/109,984, filed on Oct. 31, 2008.

(51) Int. Cl.
*C08G 64/00* (2006.01)
*C08G 63/02* (2006.01)

(52) U.S. Cl. .................. 528/481; 424/78.12; 424/78.35; 424/78.38; 424/474; 502/150; 502/152; 502/154; 528/176; 528/193; 528/194; 528/271; 528/272; 528/308; 528/480

(58) Field of Classification Search .............. 424/78.12, 424/78.35, 78.38, 474; 502/150, 152, 154; 528/176, 193, 194, 271, 272, 308, 480, 481
See application file for complete search history.

(56) References Cited

U.S. PATENT DOCUMENTS

| | | |
|---|---|---|
| 2,973,341 A | 2/1961 | Hippe et al. |
| 3,390,135 A | 6/1968 | Seiner |
| 3,469,618 A | 9/1969 | Siclari et al. |
| 3,480,587 A | 11/1969 | Porter |
| 5,525,671 A | 6/1996 | Ebato et al. |
| 5,856,423 A | 1/1999 | Bhatia |
| 5,977,251 A | 11/1999 | Kao et al. |
| 6,239,200 B1 | 5/2001 | Kao et al. |
| 6,469,129 B1 | 10/2002 | Cook et al. |
| 6,861,494 B2 | 3/2005 | DeBruin |
| 7,541,423 B2 | 6/2009 | DeBruin |
| 8,013,110 B2 * | 9/2011 | Wonders et al. ............. 528/481 |
| 8,017,723 B2 * | 9/2011 | Wonders et al. ............. 528/481 |
| 2004/0176635 A1 | 9/2004 | Lin et al. |
| 2005/0159578 A1 | 7/2005 | Parker et al. |
| 2008/0227925 A1 | 9/2008 | Pretzer |

FOREIGN PATENT DOCUMENTS

| | | |
|---|---|---|
| DE | 10 2005 002 388 A1 | 7/2006 |
| WO | WO 2004/009670 A1 | 1/2004 |
| WO | WO 2004/050239 A2 | 6/2004 |
| WO | WO 2007/110443 A1 | 10/2007 |
| WO | WO 2008/090566 A2 | 7/2008 |

OTHER PUBLICATIONS

Notification of Transmittal of the International Search Report and the Written Opinion of the International Searching Authority, or the Declaration date of mailing Jan. 20, 2010 received in corresponding International Application No. PCT/US2009/005674.
Notification of Transmittal of the International Search Report and the Written Opinion of the International Searching Authority, or the Declaration date of mailing Feb. 12, 2010 received in corresponding International Application No. PCT/US2009/005676, Feb. 8, 2012.
Notification of Transmittal of the International Search Report and the Written Opinion of the International Searching Authority, or the Declaration date of mailing Jan. 19, 2010 received in corresponding International Application No. PCT/US2009/005664.
Notification of Transmittal of the International Search Report and the Written Opinion of the International Searching Authority, or the Declaration date of mailing Jan. 20, 2010 received in corresponding International Application No. PCT/US2009/005675.

* cited by examiner

*Primary Examiner* — Terressa Boykin
(74) *Attorney, Agent, or Firm* — Oblon, Spivak, McClelland, Maier & Neustadt, L.L.P.

(57) ABSTRACT

Integrated processes for making polyesters are disclosed, that include the steps of: (a) producing an aromatic polycarboxylic acid in a monomer production facility; (b) producing a polyester in a polyester production facility, wherein the producing of the polyester comprises the substeps of: (i) forming a polyester reaction medium comprising at least a portion of the aromatic polycarboxylic acid from the monomer production facility, (ii) subjecting at least a portion of the polyester reaction medium to one or more chemical reactions to thereby produce the polyester, (iii) heating the polyester reaction medium at one or more locations in the polyester production facility via indirect heat exchange with high-pressure steam, wherein the heating causes at least a portion of the high-pressure steam to condense and thereby provide pressurized condensed water, and (iv) flashing at least a portion of the pressurized condensed water to thereby produce lower-pressure steam; and (c) using at least a portion of the lower-pressure steam to provide thermal energy to the monomer production facility.

19 Claims, 6 Drawing Sheets

INTEGRATED STEAM HEATING IN POLYESTER PRODUCTION PROCESS

This application claims priority to U.S. Provisional Application Ser. No. 61/109,984, filed Oct. 31, 2008 the disclosure of which is incorporated herein by reference in its entirety.

BACKGROUND

It is known to produce polyester polymers through condensation polymerization in the melt phase starting from diacids and/or diesters as one type of monomer and diols as the other type of monomer. In particular, it is known to form polyester polymers based on aromatic dicarboxylic acids such as terephthalic acid (TPA) as the principal diacid and ethylene glycol (EG) as the principal diol with the resulting polymer being called polyester terephthalate (PET) herein. In addition to TPA and EG, PET polymers often contain lesser amounts of other multi-carboxylic acids, e.g. aromatic acids such as isophthalic acid (IPA) and trimellitic acid (TMA), and other multi-alcohols, e.g. 1,4-cyclohexane dimethanol (CHDM) and diethylene glycol (DEG). DEG monomer may be formed in situ from dimerization of EG. Throughout this disclosure and in claims, TPA may be replaced optionally in whole or part by any of its ester derivatives, including but not limited to dimethyl terephthalate (DMT) and bis(2-hydroxyethyl) terephthalate (BHET). Collectively and individually, these various multi-carboxylic acids, multi-esters, and multi-alcohols are termed monomers, as used herein. As used herein, process materials are monomers, catalysts, polymer additives, reaction medium, PET melt product, and various byproducts of the PET formation reactions. Typical byproducts from the formation of PET comprise water, methanol and EG, and various degradation byproducts. Typical degradation byproducts from the formation of PET comprise acetaldehyde, DEG, various dioxanes, and various colored conjugated aromatic molecules. As used herein, reaction medium is a mixture comprising at least a portion of EG mixed with at least a portion of TPA and/or an ester of TPA. Optionally, reaction medium may comprise various catalysts, polymer additives, and byproducts of the PET formation reactions.

The melt-phase synthesis of PET is typically executed at temperatures in excess of 250° C. Such high temperatures are needed both to maintain the reaction medium in a flowing molten state and to promote chemical reaction rates. Generally, the importance of higher temperature increases as the degree of polymerization increases.

It is known that the heat of reaction for formation of the ester bond linkages in PET is only mildly exothermic in comparison to the thermal energy input needed to elevate the monomers to the temperature of the reaction medium and to remove as vapors the byproducts of the condensation reaction, e.g. water, methanol. In a commercial-scale PET melt product synthesis facility, very large amounts of thermal energy are added to process materials, especially to the reaction medium. Very large heat-transfer areas are needed to exchange this thermal energy through conductive, isolating, heat-exchange boundary surfaces, which typically comprise various metals and metal alloys.

The large input of thermal energy during synthesis of PET melt product is typically provided by one or more types of heat-transfer fluid through conductive, isolating, heat-exchange boundary surfaces. The conventional choices for heat-transfer fluids are various relatively high molecular weight organic materials that have relatively low vapor pressures even at temperatures in excess of 300° C. This relatively low vapor pressure, as compared to the vapor pressure of water or of low molecular weight organic materials, ameliorates the mechanical design and cost of the conductive, solid boundary surface needed to isolate the reaction mass from the heat-transfer mass while enabling the transfer of thermal energy. These low-vapor-pressure organic heat-transfer fluids are used in various combinations of liquid and vaporized forms, yielding both sensible heat and latent heat of vaporization to the process materials. Suitable low-vapor-pressure organic heat-transfer fluids are available in the Dowtherm, Therminol, and other commercial product lines; and Dowtherm A and Therminol 66 are preferred embodiments.

Unfortunately, such low-vapor-pressure organic heat-transfer fluids have several drawbacks. The low-vapor-pressure organic heat-transfer fluids have relatively low sensible heat capacity and latent heat of vaporization, especially as compared to water, and thus require relatively large mass flow rates to transfer the required amount of thermal energy into the process materials. Conduit diameters for conveying low-vapor-pressure organic heat-transfer fluids in a large PET melt product synthesis facility may exceed 0.5 m. The low-vapor-pressure organic heat-transfer fluids are flammable and require considerable safety precautions. For example, a "river of fire" can occur when an exchanger tube ruptures inside a fuel-fired furnace where the low-vapor-pressure organic heat-transfer fluid is typically heated. Despite careful selection of the organic molecules and rigorous minimization of dissolved oxygen therein, the low-vapor-pressure organic heat-transfer fluids are challenged on thermal stability in the exchanger tubes of a fuel-fired furnace where they are typically heated. The low-vapor-pressure organic heat-transfer fluids are expensive, with the filling inventory for a world-scale PET melt product synthesis facility costing in excess of one million US dollars. Thus, the combined costs for using low-vapor-pressure organic heat-transfer fluids add considerably to the cost of manufacturing PET melt product: capital cost for fuel-fired furnace; capital cost for large diameter piping, valves, insulation, controls, and pumps; capital cost for fire protection; circulation pump energy consumption; fluid degradation losses; thermal energy losses on large pipe sizes, even with thick insulation; and working capital for fluid inventory.

SUMMARY

In one aspect, the invention relates to integrated processes for making polyesters that include the steps of: producing an aromatic polycarboxylic acid in a monomer production facility; producing a polyester in a polyester production facility, wherein the producing of the polyester comprises the sub-steps of: (i) forming a polyester reaction medium comprising at least a portion of the aromatic polycarboxylic acid from the monomer production facility, (ii) subjecting at least a portion of the polyester reaction medium to one or more chemical reactions to thereby produce the polyester, (iii) heating the polyester reaction medium at one or more locations in the polyester production facility via indirect heat exchange with high-pressure steam, wherein the heating causes at least a portion of the high-pressure steam to condense and thereby provide pressurized condensed water, and (iv) flashing at least a portion of the pressurized condensed water to thereby produce lower-pressure steam; and using at least a portion of the lower-pressure steam to provide thermal energy to the monomer production facility.

Now, the inventors have discovered an economical way to use high pressure water vapor (steam) as the principal heat-transfer fluid in a polyester production facility, such as a PET melt product synthesis facility, at commercial scale, overcoming the previous economic barriers that prevented use of steam heating for this application. In certain embodiments, the polyester production facility employs a small diameter, elongated heat-exchange conduits rather than jacketed vessels, jacketed conduits, and larger diameter elongated heat-exchange conduits inside vessels. The small diameter, elongated heat-exchange conduits allow economical mechanical construction despite the very much higher pressure of steam as compared to low-vapor-pressure organic heat-transfer fluids at comparable temperature. In certain embodiments, the polyester production facility uses relatively high superficial flow velocities for process materials near conductive, isolating, heat-exchange boundary surfaces so that the heat transfer rate per unit boundary surface area is increased and the required boundary surface area is thus diminished.

In certain embodiments, the polyester production facility comprises a shell-and-tube exchanger using steam at pressures above 8 megapascals on the shell-side and with a three-phase reaction medium comprising liquid, solid, and vapor flowing with a superficial velocity above 1.4 meters per second on the tube-side in order to provide the majority of all thermal energy input to a polyester production facility.

DETAILED DESCRIPTION OF THE PREFERRED EMBODIMENTS

Figure 1:
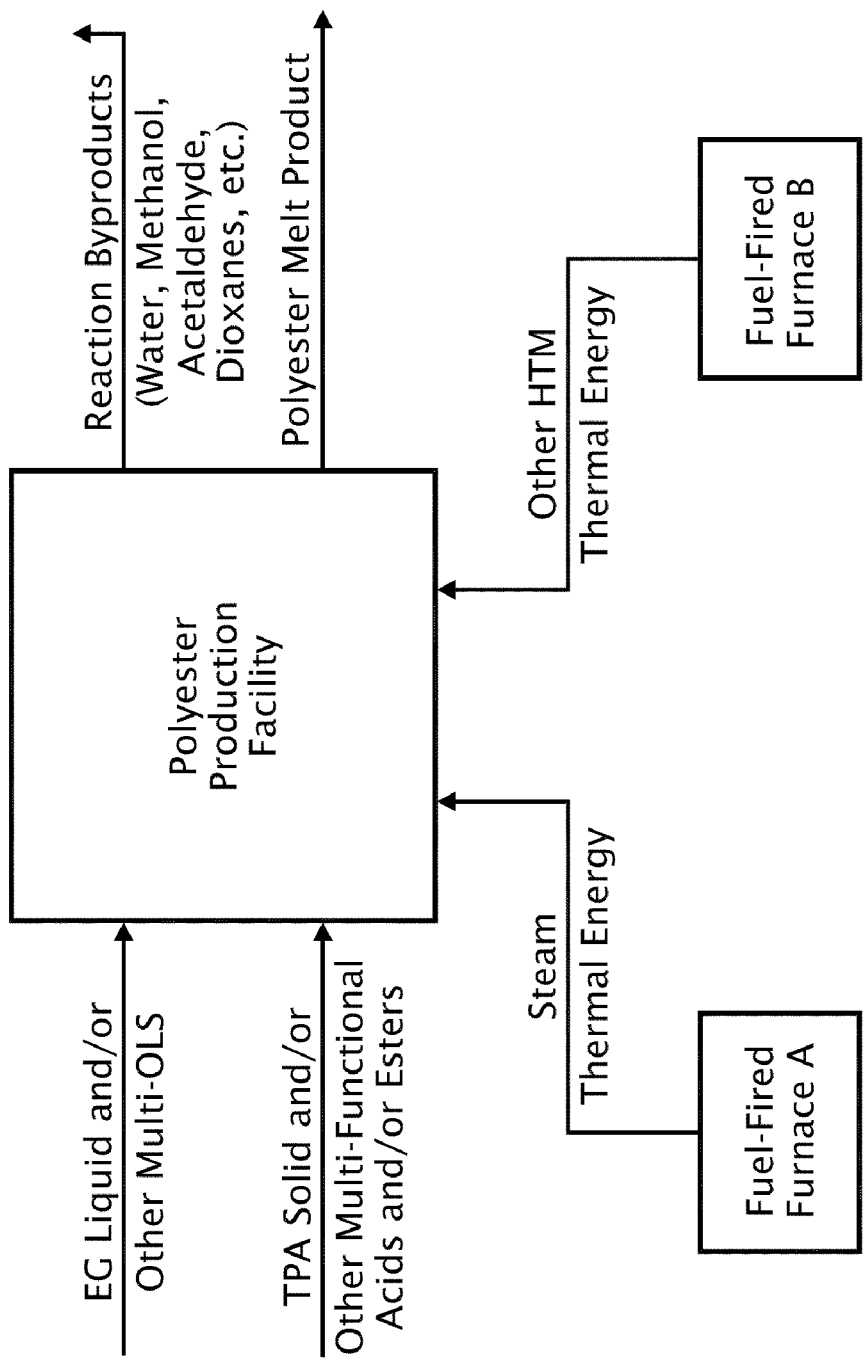
FIG. 1 is a schematic depiction of a polyester production facility showing the primary reactants introduced into the facility, the primary products produced from the facility, and two separate furnaces heating two thermal energy mediums ("steam" and "other HTM") that provide heat to the facility.
Figure 2:
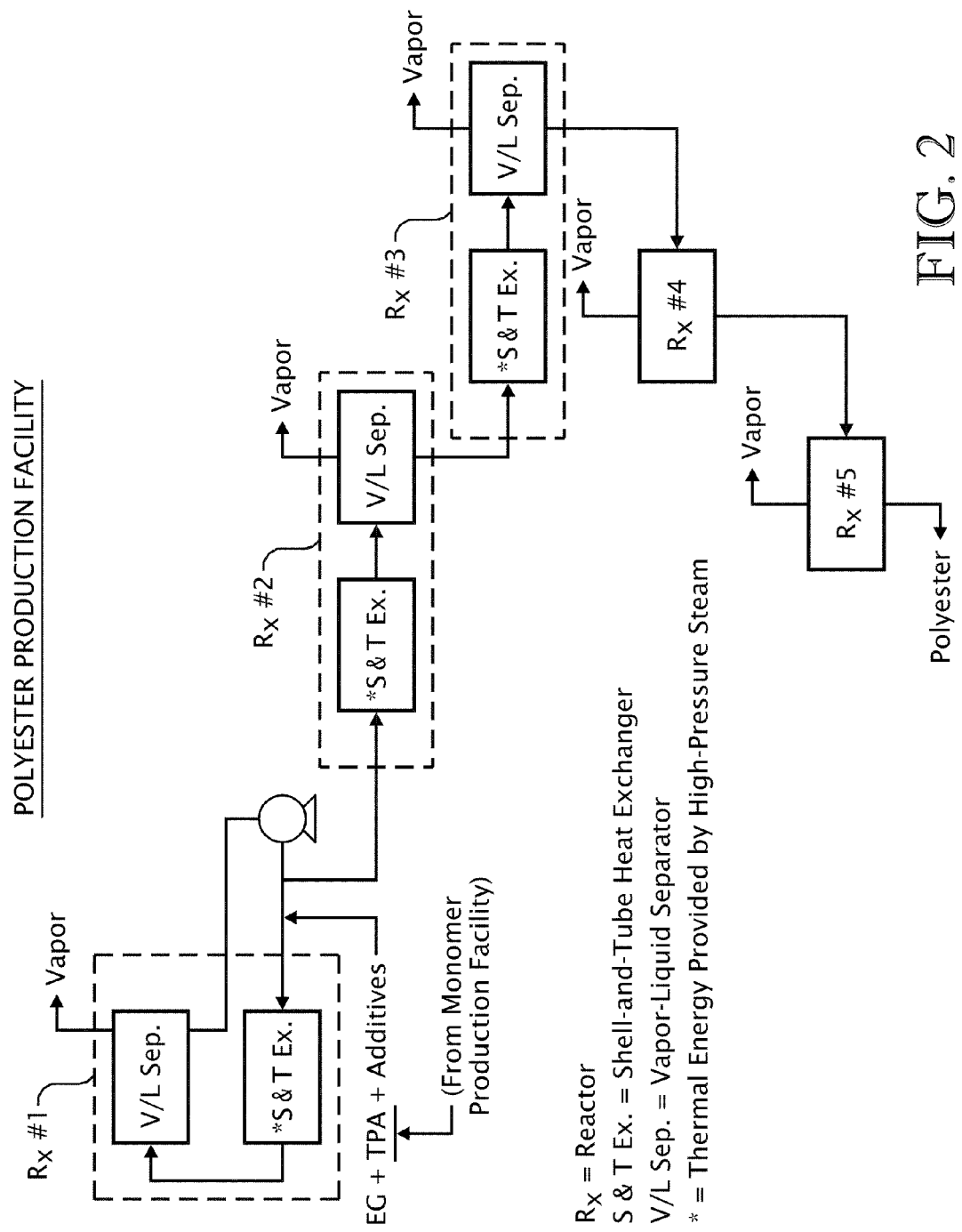
FIG. 2 is a more detail depiction of a polyester production facility showing a series of reactors (Rx#1-RX#5), with high-pressure steam providing thermal energy to the initial reactors (Rx#1-Rx#3).

The inventors have discovered and disclose herein a process for forming a polyester melt product, such as PET, from polycarboxylic acid and glycol monomers, such as TPA and EG, wherein the thermal energy input sourced from steam heat-transfer fluid is at least about 30, 50, 70, 80 percent of the total thermal energy input to the polyester production facility from all heat-transfer fluids. A schematic depiction of an exemplary polyester production facility is provided in FIG. 1. In one embodiment the polyester production facility is a PET melt product synthesis facility. FIG. 2 shows a more detailed depiction of a polymer production facility that includes a plurality of serially connected reactors (Rx#1, Rx#2, Rx,#3, Rx#4, and Rx#5). FIG. 2 also shows that each of the first three reactors has a shell-and-tube heat exchanger associated therewith, and that the shell-and-tube heat exchangers heat the reaction medium by indirect heat exchange with high-pressure steam.

The inventors have discovered that it is preferable that at least about 30, 50, 70, 80 percent of the thermal energy input from steam heat-transfer fluid into a polyester production facility is provided by direct transfer of thermal energy from steam through conductive, isolating, heat-exchange boundary surfaces into reaction medium. This is as distinguished from transferring thermal energy from steam heat-transfer fluid into separated monomers not combined into reaction medium.

The inventors have discovered a process and preferred apparatus for forming polyester melt product, such as PET, from monomers, such as TPA and EG, wherein the total thermal energy input sourced from steam heat-transfer fluid is at least about 400, 800, 1200, 1400 joules per gram of polyester melt product. More preferably, at least about 350, 700, 900, 1200 joules per gram of polyester melt product is exchanged directly from steam heat-transfer fluid into reaction medium, as distinguished from going into separated monomers not combined into reaction medium.

Preferably the supply pressure of at least about 30, 50, 70, 90 weight percent of the steam heat-transfer fluid is at least about 2, 5, 6, 7, 9 megapascal at the locations where thermal energy is transferred into process materials. In contrast, the supply pressures of low-vapor-pressure organic heat-transfer fluids used in a polyester production facility are typically less than about 2 megapascals, requiring much less metal thickness for containment.

More preferably, the condensing temperature matching the pressure of the steam heat-transfer fluid used to heat reaction medium is at least about 260, 275, 290, 305 degrees Celsius. Higher condensing temperatures provide a larger temperature gradient for exchanging thermal energy into reaction medium, thus relatively reducing the areas required for conductive, isolating, heat-exchange boundary surfaces.

However, higher condensing temperatures also require greater supply and containment pressures for steam heat-transfer fluid. Thus, it is preferred that the supply and condensing pressures of the steam heat-transfer fluid are limited to less than about 20, 16, 14, 12 megapascal for reasons of economy in mechanical design for supply conduits and vessels and for conductive, isolating, heat-exchange boundary surfaces.

In contrast to the steam pressure, the pressure of the process materials is much less, preferably being less than about 1, 0.5, 0.2, 0.1 megapascal for the monomers, reaction medium and byproducts. As the degree of polymerization and molecular weight of the reaction medium are increased, it is preferred that the pressure of the reaction medium is lowered to less than about 0.05, 0.01, 0.001, 0.0001 megapascal.

Also, it is preferred that the temperature of the steam supplied to the polyester production facility is less than about 600, 500, 400, 350 degrees Celsius. At any given pressure, the steam can be far hotter than its equilibrium condensing temperature. In some applications, such as power generation, it is highly desirable that the steam supply contain a great amount of superheat. However, in a polyester production facility, excessive superheat increases costs for metal used for mechanical containment of the steam. Also, the temperature of superheated steam is potentially damaging to the process materials, especially in films of process materials contacting conductive, isolating, heat-exchange boundary surfaces, especially during operating excursions with less than design flow rates of process materials.

In certain embodiments, the polyester production facility employs conductive, isolating, heat-exchange boundary surfaces that have a small diameter. This lowers the cost for mechanical containment of high pressure steam, and it also proves important in maximizing the heat-transfer coefficient on the process side, as is disclosed farther below. For at least about 30, 50, 70, 90 percent of the thermal energy transferred from steam to the polyester production, it is preferred that the outside diameter of the conductive, isolating, heat-exchange boundary surfaces is less than about 0.3, 0.15, 0.06, 0.03, or 0.003 meters.

When a conductive, isolating, heat-exchange boundary surface does not form a completely closed path with respect to the process material, e.g., a segmented jacket on a cylindrical vessel or conduit that does not cover a full 2*PI radians of circumference, then the diameter of that heat-exchange boundary surface shall be taken to mean two times the minimum radius of curvature of that particular heat-exchange boundary surface.

Elongated conduits comprising small diameter, isolating, heat-exchange boundary surfaces are referred to herein as tubes. The inside of the tubes is referred to herein as tube-side. The outside of the tubes is referred to herein as shell-side.

In certain embodiments, the polyester production facility provides relatively high superficial flowing velocities for the reaction medium in order to promote the amount of thermal energy transferred compared to the size and cost of the heat-exchange means. In a conventional process for forming polyester melt product using low-vapor-pressure organic heat-transfer fluids, both sides of the heat-exchange surfaces are contacted by organic liquids. The thermal conductivities of monomers and reaction medium are roughly comparable to those of typical low-vapor-pressure organic heat-transfer fluids. Especially when the degree of polymerization of the reaction medium and its viscosity are relatively low, the heat-transfer film coefficients are similar for reaction medium and for typical low-vapor-pressure organic heat-transfer fluids. In contrast, the heat-exchange properties of condensing steam are far greater. For example, a film coefficient for heat-exchange from condensing steam is typically greater than about 6,000 watts per square meter per degree Celsius, which contrasts with a film coefficient for heat-exchange from liquid low-vapor-pressure organic heat-transfer fluid that is typically less than about 2,000 watts per square meter per degree Celsius. Such a large difference in film coefficient for heat-exchange indicates that the process-side film coefficient, rather than the steam-side film coefficient, will largely control the overall heat-exchange rate across the conductive, isolating, heat-exchange boundary surfaces. Increasing the superficial velocity of the process flows usefully increases the heat-transfer film coefficient on the process side of the heat-exchange boundary surface. Increasing the heat-transfer film coefficient on the process side is particularly valuable with steam heat-transfer fluid because of the greater thickness and cost of metal for pressure containment, as compared to a low-vapor-pressure organic heat-transfer fluid.

In one embodiment of the invention, it is preferred to provide a superficial velocity of process materials, especially reaction medium, that is at least about 0.7, 1.4, 3, 5 meters per second near conductive, isolating, heat-exchange boundary surfaces. It is preferable that the above superficial velocities are provided within tubes. Superficial velocity has the usual meaning of time-averaged volumetric flow divided by the cross sectional area surrounded by the containing and isolating boundary surface and measured in a plane orthogonal to the direction of the time-averaged volumetric flow.

In another embodiment of the invention, it is preferred to provide a liquid and vapor multiphase flow of reaction medium within a heat-exchange means. The vapor phase preferably comprises both EG monomer and reaction byproducts. In this embodiment, it is preferable that the volume fraction of vaporized reaction medium is at least about 25, 50, 75, 95 volume percent of the total volume of the reaction medium in the heat-exchange means. It is preferable that the above volume fractions are provided in a portion of reaction medium within or near the outlet of reaction medium from a tube in a heat-exchange means.

In another embodiment of the invention, it is preferred to provide a liquid and solid multiphase flow of reaction medium within a heat-exchange means. More preferably, the solid phase comprises a polycarboxylic acid, such as TPA. In this embodiment, it is preferable that the mass fraction of polycarboxylic acid solid particles is at least about 2, 4, 6, 8 weight percent of the reaction medium. In this embodiment, it is also preferable that the mass fraction of polycarboxylic acid solid particles is less than about 60, 40, 25, 15 weight percent of the reaction medium in the heat-exchange means. It is preferable that the above mass fractions are provided in a portion of reaction medium within or near the inlet of reaction medium into a tube in a heat-exchange means.

In still yet another embodiment of the invention, it is preferred to provide a three-phase reaction medium comprising solid TPA particles, vapor components, and liquid components within the heat-exchange means. The above preferred volume fractions of vapor and the above preferred mass fractions of solid apply in all physically realizable combinations for this three-phase mixture.

The inventors have discovered that a preferred embodiment of the invention places the steam heat-transfer fluid on the shell side and the process materials on the tube side. Indeed, this is a preferred embodiment when the process material is specifically reaction medium, more specifically when the reaction medium comprises TPA solid, and most specifically when the reaction medium is a three-phase mixture comprising solid TPA, vapor components, and liquid components.

This arrangement with steam heat-transfer fluid on the shell-side requires the mechanical design of both the tube-side and shell-side to withstand the pressure of the steam heat-transfer fluid. This causes greater capital cost than if the lower pressure process material were on the shell-side. However, the inventors have discovered that placing the process material on the tube-side provides very great advantages. First, this disposition provides greater control of the velocity of the process material near the conductive, isolating, heat-exchange boundary surfaces, thus helping to maximize film coefficients for heat transfer in order to reduce overall capital cost. Second, this disposition provides greater control of the maximum film temperature of the process material near the conductive, isolating, heat-exchange boundary surfaces. This can be important when the process material is reaction medium in order to optimize the balance between desired polymerization and undesirable side reactions such as dimerization of EG to diethylene glycol (DEG) and such as formation of colored impurities in the polyester melt product. Third, this disposition provides greater control of the residence time and residence time distribution of the process materials. Again, this is especially important for reaction medium in order to optimize the balance between desired polymerization and undesirable side reactions.

It is preferred that the overall heat-exchange coefficient between steam heat-transfer fluid and process materials, especially reaction medium, is at least about 5, 100, 250, 500 watts per square meter per degree Celsius. This is achieved by selection of steam pressures and temperatures, tube diameters, process material compositions, process material superficial velocities, and tube metallurgies according to the disclosures herein. The overall heat-exchange coefficient is based on the outside diameter of the tubes and is calculated according to methods and standards of the Heat Transfer Research Institute.

The inventors disclose that certain embodiments of the present invention can be particularly useful for the emerging scale of polyester production facilities with capacities from a single facility and or a single polyester melt product reactor of at least about 100, 200, 400, 600 million kilograms per year. Existing steam boilers are already extremely large, with combustion power inputs even greater than one gigawatt. Fired furnaces for heating low-vapor-pressure organic heat-transfer fluids can also be made quite large. However, design of a fired furnace for low-vapor-pressure organic heat-transfer fluids must pay strict attention to film temperatures in order to avoid thermal degradation of the fluids. This imposes more restrictive constraints on the firing temperature and on the size and layout of the heater tubes, as compared to a steam boiler. Mass flow rates per watt of thermal energy content are far less for condensing steam than for low-vapor-pressure organic heat-transfer fluids. Pipe sizes for the condensate-water return to a boiler are much smaller than for low-vapor-pressure organic heat-transfer fluids. Pipe sizes for steam supply are also smaller, albeit at a higher pressure rating.

The inventors have discovered that certain embodiments of the present invention can be particularly useful for providing thermal energy to a reaction medium of a single polyester synthesis process facility wherein the thermal energy thermal input from steam heat-transfer fluid is at least about 10, 20, 30, 40 megawatts from steam heat-transfer fluid.

The inventors have discovered that certain embodiments of the present invention can be particularly useful for providing thermal energy to a reaction medium of a single reaction step within a polyester synthesis process facility wherein the thermal energy input from steam heat-transfer fluid is at least about 5, 10, 15, 25 megawatts.

The inventors have discovered that certain embodiments of the present invention can be particularly useful with shell and tube heat-exchange means having tube areas in a single means of at least about 300, 1000, 2500, 4000 square meters, based on the outside diameter of the tubes.

The inventors have discovered that certain embodiments of the present invention can be useful for exchangers wherein the tubes are made from any of the many stainless steel alloys, with 304L especially preferred, and the shell is made from any steel alloy, including any stainless steel alloy.

As yet another aspect of the invention, the inventors have discovered that a preferred method for heating a low-vapor-pressure organic heat-transfer fluid for use in a polyester production facility comprises using steam heat-transfer fluid to provide thermal energy to a low-vapor-pressure organic heat-transfer fluid. This is especially preferred in a polyester production facility wherein at least a portion of thermal energy is provided to process materials by steam heat-transfer fluid directly through conductive, isolating, heat-exchange boundary surfaces according to at least one disclosure herein. In a polyester production facility, a considerable number of relatively low duty heating systems, such as piping and equipment tracer circuits, are needed to provide small thermal energy duties to process materials and to offset ambient losses of thermal energy, such as losses through insulation. These low duty heating systems are particularly required for pre-heating conduits and equipment before admitting the flow of process materials, for when the flows of process materials are temporarily idled, and for when the flows of process materials are reduced to very low rates. Although steam heat-transfer fluid as disclosed herein is sufficiently hot for this dispersed, low duty service, the very high pressures required cause capital and maintenance costs to be economically unfavorable for using the steam in the service. Thus, even when larger thermal energy duties for process materials are converted to steam heat-transfer fluid, there remains a need in a PET melt product synthesis facility for a thermal energy supply system using a low-vapor pressure organic heat-transfer fluid. For such relatively low duty heating systems using a low-vapor-pressure organic heat-transfer fluid, the inventors have discovered that it is more economical to increase the size of the fuel-fired steam boiler and to use part of this steam to heat the low-vapor-pressure organic heat-transfer fluid, as compared to providing a separate fuel-fired furnace for the low-vapor-pressure organic heat-transfer fluid.

The advantage of using steam heat-transfer fluid to provide thermal energy to a low-vapor-pressure organic heat-transfer fluid is especially pronounced when reliability is considered. The additional complex failure modes intrinsic with providing at least one fuel-fired furnace for low-vapor-pressure organic heat-transfer fluid are efficaciously replaced by a simple heat-exchange means, which means typically comprises no moving mechanical parts and which does not require controls and interlocks for combustion safety and environmental emissions.

Figure 3:
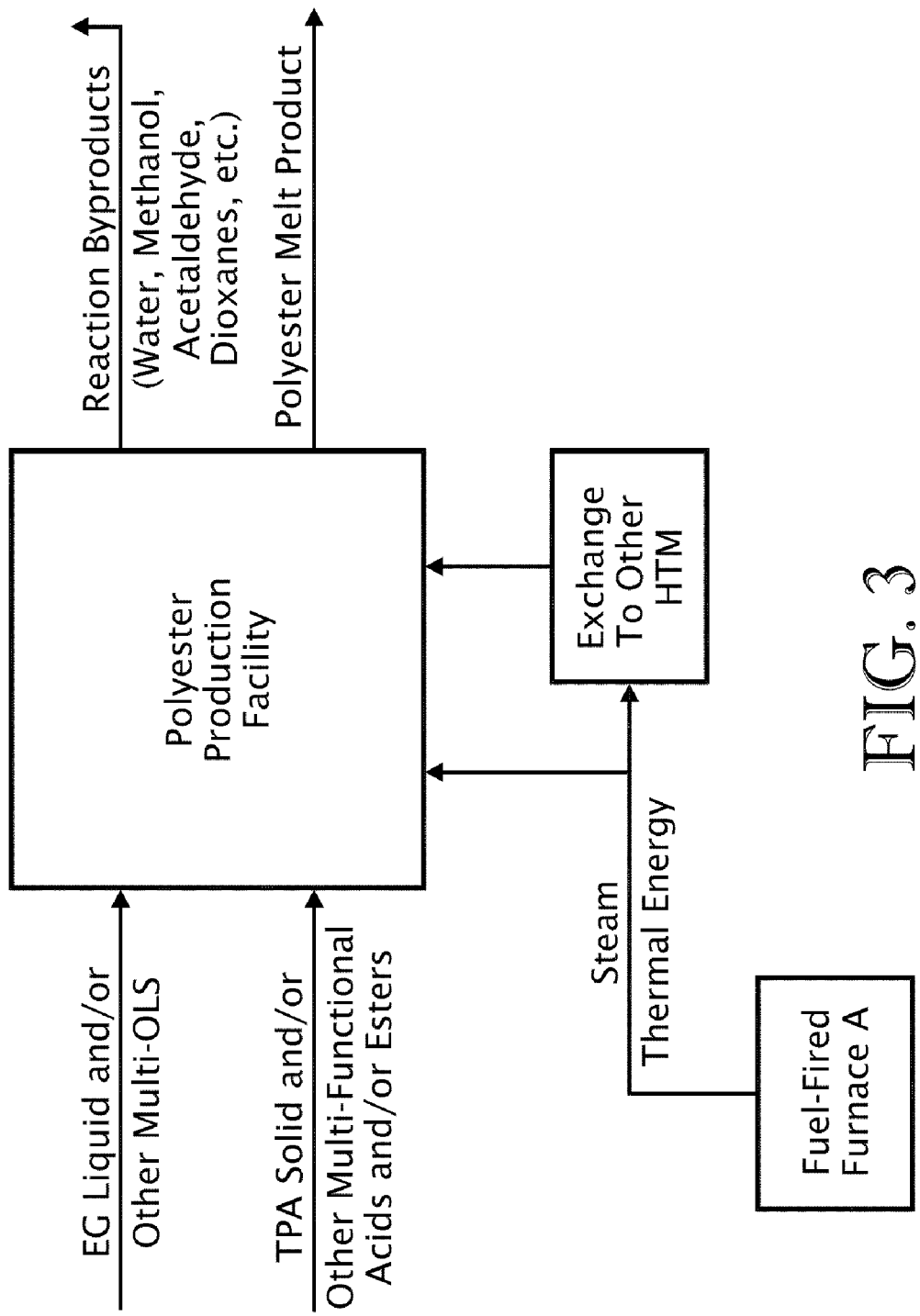
FIG. 3 is a schematic depiction of a polyester production facility similar to the facility of FIG. 1, but employing only a single furnace to heat steam that is subsequently used to provide thermal energy to the facility, both directly and through heat exchange with another heat transfer medium (HTM).

Thus, the inventors disclose a polyester production facility using steam heat-transfer fluid, according to according to at least one disclosure herein, as the only heat-transfer fluid that receives thermal energy directly from a fuel-fired furnace. More preferably, the polyester production facility also receives at least a portion of thermal energy from another heat-transfer fluid that receives at least a portion of thermal energy from the fuel-fired steam. Such a configuration is schematically illustrated in FIG. 3. Most preferably, the polyester production facility receives at least a portion of thermal energy from a low-vapor-pressure organic heat-transfer fluid that is heated by the steam heat-transfer fluid in a heat exchange means comprising tubes. It is preferred that the low-vapor-pressure organic heat-transfer fluid is heated by steam to a supply bulk temperature of at least about 250, 270, 290, 310 degrees Celsius. It is preferred that the low-vapor-pressure organic heat-transfer fluid is heated by steam to a supply bulk temperature of less than about 400, 360, 340, 330 degrees Celsius. It is preferred that the maximum film temperature of the low-vapor-pressure organic heat-transfer fluid is less than about 400, 360, 340, 330 degrees Celsius at the conductive, isolating, heat-exchange boundary surfaces contacted by steam heat-transfer fluid.

The inventors also disclose preferred ranges for the amount thermal energy provided by a low-vapor-pressure organic heat-transfer fluid that provides thermal energy to a polyester production facility. These energy values are much lower than in a conventional polyester production facility because the major duties for thermal energy are transferred to steam heat-transfer fluid according to certain embodiments of the invention disclosed herein. It is preferred that the thermal energy supplied to a polyester production facility by low-vapor-pressure organic heat-transfer fluid is less than about 800, 600, 400, 300 joules per gram of polyester melt product. More preferably, the organic heat-transfer fluid is heated by steam heat-transfer fluid according to the disclosures herein. It is preferred that the thermal energy supplied to a polyester production facility by low-vapor-pressure organic heat-transfer fluid is at least about 40, 80, 120, 160 joules per gram of polyester melt product. More preferably, the organic heat-transfer fluid is heated by steam heat-transfer fluid according to the disclosures herein.

In yet another embodiment of the invention, it is preferred that condensate-water is taken from at least one heat-exchange means that is using steam heat-transfer fluid operating according to at least one embodiment herein and that the condensate-water is reduced in pressure to form lower pressure flashed-steam heat-transfer fluid. The means for converting the condensate-water to the flashed-steam can be located either inside or outside the polyester production facility. It is preferred that at least a portion of the flashed-steam heat-transfer fluid is formed having a pressure that is less than about 8, 7, 5, 2 megapascals. It is preferred that at least a portion of the flashed-steam heat-transfer fluid is formed having a pressure that is at least about 0.2, 0.6, 1.0, 1.5 megapascals. It is preferred that at least a portion of the flashed-steam heat-transfer fluid is produced from condensate-water that is formed from steam heat-transfer fluid used to heat reaction medium. It is preferred that at least a portion of the flashed-steam heat-transfer fluid is produced from condensate-water that is formed from steam heat-transfer fluid used to heat a low-vapor-pressure organic heat-transfer fluid.

Figure 4:
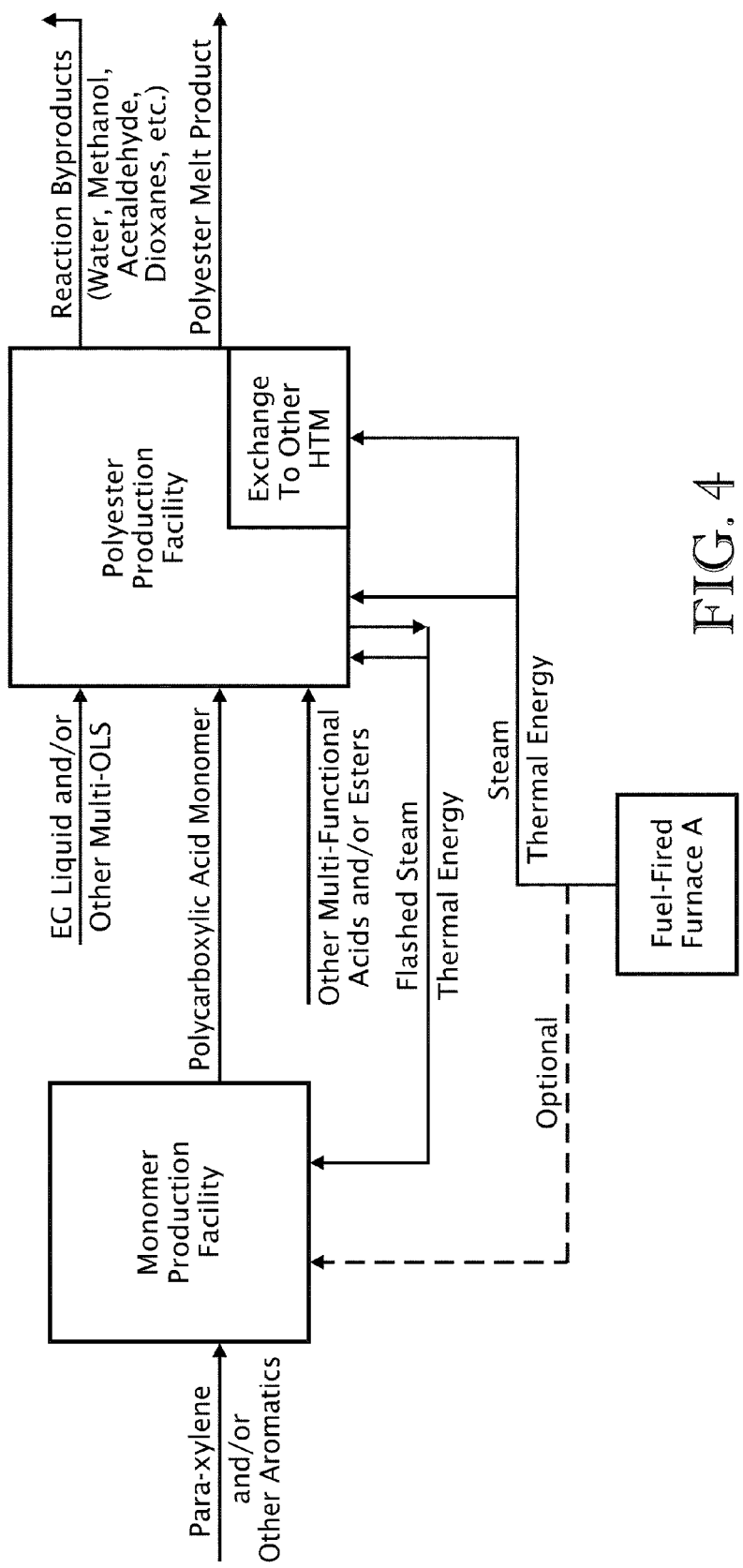
FIG. 4 is a schematic depiction of a monomer production facility and a polyester production facility with heat-integration between the two facilities.

It is preferred that at least a portion of the flashed-steam heat-transfer fluid is used to provide energy to a polyester production facility and/or other adjacent chemical synthesis facilities. It is preferred that at least a portion of the flashed-steam heat-transfer fluid is used within a polyester production facility to provide thermal energy to process materials. More preferably, at least a portion of the flashed-steam heat-transfer fluid is used within a polyester production facility to form at least a portion of vaporized process material. Most preferably, at least a portion of the flashed-steam heat-transfer fluid is used within a polyester production facility to heat liquid EG to form vapor EG. Such a configuration is schematically illustrated in FIG. 4.

Figure 5:
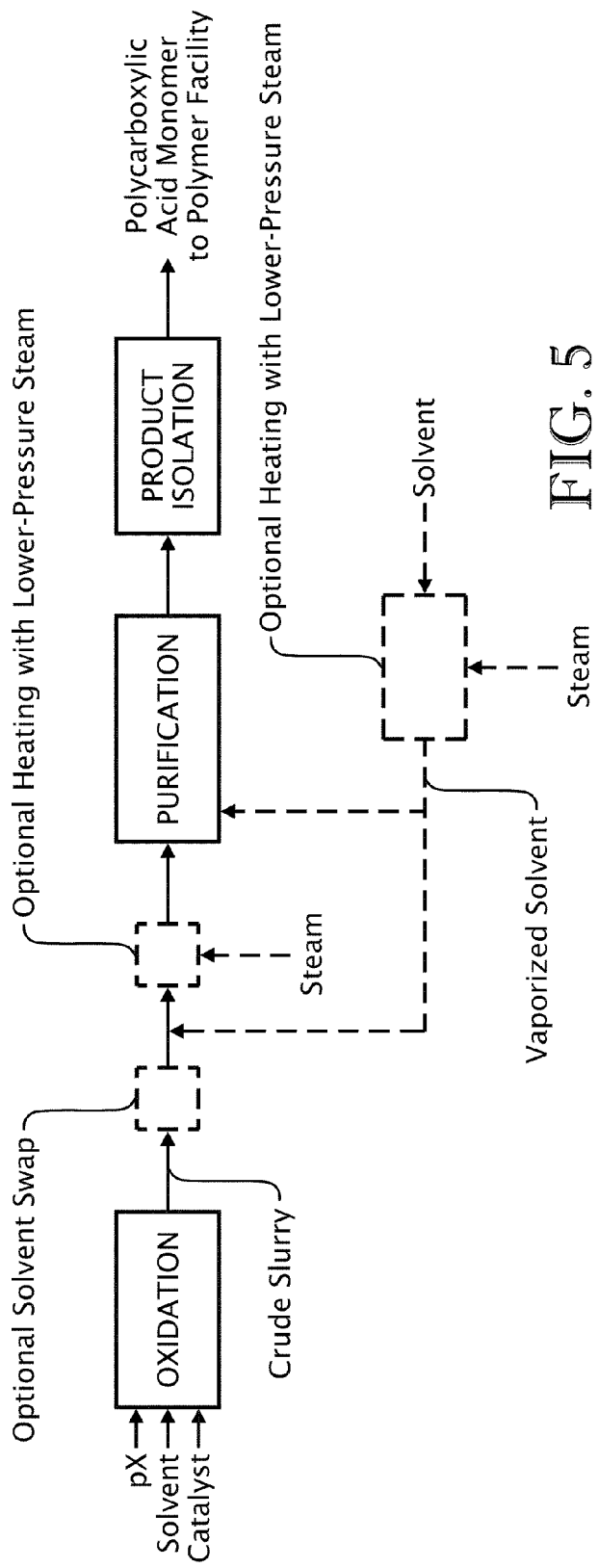
FIG. 5 is a more detailed depiction of the monomer production facility of FIG. 4 showing the individual steps of monomer production, as well as locations where heating can be provided by low-pressure steam.

Additionally, it is preferred that at least a portion of the flashed-steam heat-transfer fluid is used in an adjacent terephthalic acid synthesis facility. An exemplary monomer production facility, such as a terephthalic acid (TPA) synthesis facility, is schematically depicted in FIG. 5. The temperature of many major heat duties in a monomer production facility are usefully less than in a polyester production facility, and this enables a favorable, efficient, energy integration when steam heat-transfer fluid is used. The temperature of the reaction medium in a polyester production facility is preferably at least about 250 degrees Celsius; and, as disclosed above, it is preferred that the condensing temperature of the steam heat-transfer fluid therein is at least about 260, 275, 290, 305 degrees Celsius.

Figure 6:
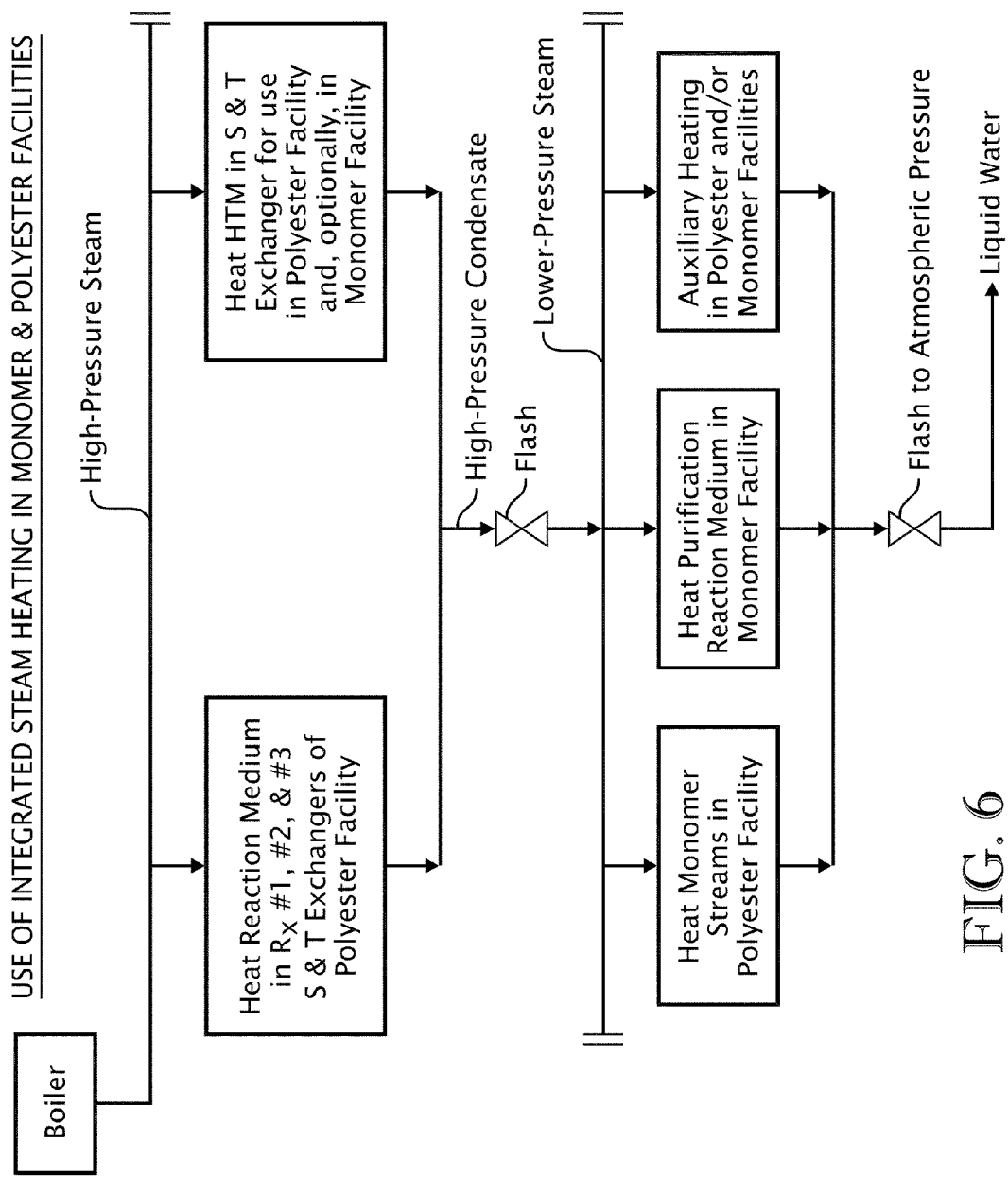
FIG. 6 is a schematic depiction of a system for heat-integrating a monomer production facility and a polyester production facility using flashed steam and steam-heating of another HTM.

FIG. 6 depicts one embodiment of a system for integrate steam heating of a polymer production facility, such as a PET melt product synthesis facility and a monomer production facility, such as a TPA synthesis facility. In particular, FIG. 6 shows how the heating duty of high-pressure and lower-pressure steam can be divided up among the polymer and monomer facilities.

In the monomer production facility, it is preferred that at least about 30, 50, 70, 80 percent of the total thermal energy input from heat transfer fluids is to a process temperature of less than about 295, 280, 265, 250 degrees Celsius. It is preferred that the terephthalic acid synthesis facility is located such that the minimum horizontal distance from the polyester production facility is less than about 1800, 900, 300, 100 meters. It is preferred that the terephthalic acid synthesis facility forms at least a portion of terephthalic acid product by partial oxidation of para-xylene, more preferably using molecular oxygen. It is preferred that at least a portion of the terephthalic acid product is fed into a reaction medium of the adjacent polyester production facility within less than about 72, 24, 12, 4 hours after being formed from para-xylene.

The invention may include various separate aspects, as set forth herein. Thus, in one aspect, the invention relates to integrated processes for making polyesters, the processes including the steps of: (a) producing a polycarboxylic acid and/or a polyol in a monomer production facility; (b) producing a polyester in a polyester production facility, wherein the producing of the polyester comprises the substeps of—(i) forming a polyester reaction medium comprising at least a portion of the polycarboxylic acid and/or polyol from the monomer production facility, (ii) subjecting at least a portion of the polyester reaction medium to one or more chemical reactions to thereby produce the polyester, (iii) heating the polyester reaction medium at one or more locations in the polyester production facility via indirect heat exchange with high-pressure steam, wherein the heating causes at least a portion of the high-pressure steam to condense and thereby provide pressurized condensed water, and (iv) flashing at least a portion of the pressurized condensed water to thereby produce lower-pressure steam; and a further step of (c)

using at least a portion of the lower-pressure steam to provide thermal energy to the monomer production facility.

In another aspect, the producing of step (a) may include the substeps of: (i) oxidizing an aromatic compound to thereby form particles of a crude polycarboxylic acid, and (ii) purifying the crude polycarboxylic acid to thereby provide a purified polycarboxylic acid.

In a further aspect, step (c) may include using at least a portion of the lower-pressure steam to provide thermal energy for the purifying step, so that the purifying step is carried out at a higher temperature than the oxidizing step. In yet another aspect, the purifying step may be carried out at a temperature that is at least 5° C., or at least 10° C., or at least 20° C. greater than the temperature at which the oxidizing step is carried out. In a further aspect, the purifying step comprises oxidation and/or hydrogenation of impurities originally present in the particles of crude polycarboxylic acid.

In yet another aspect, step (c) may include heating a purification feed stream by indirect heat exchange with the lower-pressure steam, and may include introducing the heated purification feed stream into a purification reactor within which the purifying step is carried out. In yet another aspect, step (c) may further include heating a direct heating medium by indirect heat exchange with the lower-pressure steam, and may further include physically combining the resulting heated direct heating medium with a purification feed stream and/or with a purification reaction medium subjected to the purifying step. In yet another aspect, the heating of the direct heating medium may cause vaporization of the direct heating medium. In yet another aspect, the direct heating medium may comprise water and/or acetic acid.

In yet another aspect, the process may further include heating a heat transfer medium (HTM) that is not steam by indirect heat exchange with the high-pressure and/or lower-pressure steam to thereby provide heated HTM, and may further include using a first portion of the heated HTM to provide heating in the polyester production facility. In another aspect, the processes of the invention may further comprise using a second portion of the heated HTM to provide heating in the monomer production facility, and wherein at least a portion of the heated HTM is used in pipe jackets, equipment jackets, pipe tracing, and/or equipment tracing of the polyester production facility and/or the monomer production facility.

Example

This is a calculational example that quantifies the heat duty associated with PET melt product synthesis facilities. The table below, sets forth calculated values for the heat duties of a PET melt product synthesis facility constructed in accordance with the inventive embodiment depicted in FIG. 2, where all heat duties are supplied by steam.

|  | BTU/hr | BTU/lb PET | % | J/g | MW |
|---|---|---|---|---|---|
| PET Melt Synthesis | | | | | |
| HTM S&T Ex | 24,000,000 | 131 | 13.9% | 304 | 7.0 |
| Rx#1 S&T Ex | 115,400,000 | 628 | 67.0% | 1,461 | 33.8 |
| Rx#2 S&T Ex | 10,500,000 | 57 | 6.1% | 133 | 3.1 |
| Rx#3 S&T Ex | 3,000,000 | 16 | 1.7% | 38 | 0.9 |
| EG vapor, vacuum jets | 14,127,000 | 77 | 8.2% | 179 | 4.1 |
| EG Water Column | 5,130,000 | 28 | 3.0% | 65 | 1.5 |
| total PET | 172,157,000 | 937 | 100.0% | 2,180 | 50.5 |
| Rxn medium, including ambient loss | | | | | |
| HTM S&T Ex | 24,000,000 | 131 | 15.7% | 304 | 7.0 |
| 3 Rx Ex | 128,900,000 | 702 | 84.3% | 1,632 | 37.8 |
| total PET | 152,900,000 | 832 | 100.0% | 1,936 | 44.8 |

83,307 kg/hr PET
183,692 lb/hr PET
350 days/yr
700,000,000 kg/yr PET
HTM = Heat Transfer Medium = low-vapor-pressure organic heat-transfer fluid
S&T Ex = Shell and Tube Exchanger
Rx = Reactor In a conventional PET melt product synthesis facility, at least the first four heating duties, which sum to 152,900,000 BTU/hr (1,936 joules per gram; 44.8 megawatts), would be provided by a fuel-fired furnace heating low-vapor-pressure organic heat-transfer fluid (HTM).

We claim:

1. An integrated process for making a polyester, the process comprising:
   (a) producing an aromatic polycarboxylic acid in a monomer production facility;
   (b) producing a polyester in a polyester production facility, wherein the producing of the polyester comprises the substeps of:
      (i) forming a polyester reaction medium comprising at least a portion of the aromatic polycarboxylic acid from the monomer production facility,
      (ii) subjecting at least a portion of the polyester reaction medium to one or more chemical reactions to thereby produce the polyester,
      (iii) heating the polyester reaction medium at one or more locations in the polyester production facility via indirect heat exchange with high-pressure steam, wherein the heating causes at least a portion of the high-pressure steam to condense and thereby provide pressurized condensed water, and
      (iv) flashing at least a portion of the pressurized condensed water to thereby produce lower-pressure steam; and
   (c) using at least a portion of the lower-pressure steam to provide thermal energy to the monomer production facility.

2. The process of claim 1, wherein the producing of step (a) includes the substeps of:
   (i) oxidizing an aromatic compound to thereby form particles of a crude aromatic polycarboxylic acid, and
   (ii) purifying the crude polycarboxylic acid to thereby provide a purified aromatic polycarboxylic acid.

3. The process of claim 2, wherein the aromatic compound comprises p-xylene.

4. The process of claim 2, wherein step (c) includes using at least a portion of the lower-pressure steam to provide thermal energy for the purifying step, so that the purifying step is carried out at a higher temperature than the oxidizing step.

5. The process of claim 4, wherein the purifying step comprises oxidation and/or hydrogenation of impurities originally present in the particles of crude aromatic polycarboxylic acid.

6. The process of claim 2, wherein step (c) includes heating a purification feed stream by indirect heat exchange with the lower-pressure steam, wherein the heated purification feed stream is introduced into a purification reactor within which the purifying step is carried out.

7. The process of claim 2, wherein step (c) includes heating a direct heating medium by indirect heat exchange with the lower-pressure steam, wherein the resulting heated direct heating medium is physically combined with a purification feed stream and/or with a purification reaction medium subjected to the purifying step.

8. The process of claim 7, wherein the heating of the direct heating medium causes vaporization of the direct heating medium.

9. The process of claim 7, wherein the direct heating medium comprises water and/or acetic acid.

10. The process of claim 1, further comprising steps of: heating a heat transfer medium (HTM) that is not steam by indirect heat exchange with the high-pressure and/or lower-pressure steam to thereby provide heated HTM; and using a first portion of the heated HTM to provide heating in the polyester production facility.

11. The process of claim 10, further comprising using a second portion of the heated HTM to provide heating in the monomer production facility.

12. The process of claim 11, wherein at least a portion of the heated HTM is used in one or more of: a pipe jacket, an equipment jacket, a pipe tracing, or equipment tracing of the polyester production facility or the monomer production facility.

13. The process of claim 1, wherein the aromatic polycarboxylic acid comprises one or more of terephthalic acid or isophthalic acid.

14. The process of claim 1, wherein the aromatic polycarboxylic acid comprises terephthalic acid.

15. The process of claim 1, wherein at least 50% of the thermal energy input from the high-pressure steam is provided by direct transfer of thermal energy from the high-pressure steam through conductive, isolating, heat-exchange boundary surfaces into the polyester reaction medium.

16. The process of claim 1, wherein at least 80% of the thermal energy input from the high-pressure steam is provided by direct transfer of thermal energy from the high-pressure steam through conductive, isolating, heat-exchange boundary surfaces into the polyester reaction medium.

17. The process of claim 1, where the high-pressure steam has a temperature of less than 350° C.

18. The process of claim 15, wherein the high-pressure steam is input through a conductive, isolating, heat-exchange boundary surface in the form of a pipe having a diameter of less than 0.3 m.

19. The process of claim 16, wherein the high-pressure steam is input through a conductive, isolating, heat-exchange boundary surface in the form of a pipe having a diameter of less than 0.3 m.

\* \* \* \* \*